United States Patent [19]
Arakawa

[11] Patent Number: 4,691,589
[45] Date of Patent: Sep. 8, 1987

[54] VISCOUS ROTARY DAMPER

[75] Inventor: Masaru Arakawa, Chigasaki, Japan

[73] Assignee: Nifco Inc., Yokohama, Japan

[21] Appl. No.: 827,546

[22] Filed: Feb. 3, 1986

[30] Foreign Application Priority Data

Feb. 8, 1985 [JP] Japan ............................ 60-15955[U]

[51] Int. Cl.⁴ .......................................... F16F 15/10
[52] U.S. Cl. ..................................... 74/573 F; 74/574
[58] Field of Search ...................... 74/573 F, 574, 572

[56] References Cited

U.S. PATENT DOCUMENTS

| | | | |
|---|---|---|---|
| 3,040,598 | 6/1962 | Warren | 74/573 F |
| 4,134,309 | 1/1979 | Balke et al. | 74/573 F |
| 4,173,158 | 11/1979 | Geislinger | 74/574 |
| 4,208,928 | 6/1980 | Conseur et al. | 74/574 |
| 4,254,985 | 3/1981 | Kirschner | 74/574 |
| 4,339,963 | 7/1982 | Bremer | 74/573 F |
| 4,341,130 | 7/1982 | Shepherd et al. | 74/574 |
| 4,462,270 | 7/1984 | Cooper et al. | 74/574 |

FOREIGN PATENT DOCUMENTS 59-25604  2/1984  Japan ................................ 74/604

Primary Examiner—Gary L. Smith
Assistant Examiner—Vinh Luong
Attorney, Agent, or Firm—Trexler, Bushnell, Giangiorgi & Blackstone, Ltd.

[57] ABSTRACT

A rotary damper comprises a driven gear having a cylindrical projection projecting from its rear surface and a case with a bottom and having a cylindrical groove, the cylindrical projection being received in the cylindrical groove, grease filling a gap defined between the cylindrical projection and the cylindrical groove, an outer wall of the case defining the cylindrical groove being formed on its inner periphery and adjacent to its distal end with an annular depression having a greater outer diameter than the diameter of the inner periphery, and the grease being partly forced out into the annular depression.

3 Claims, 5 Drawing Figures

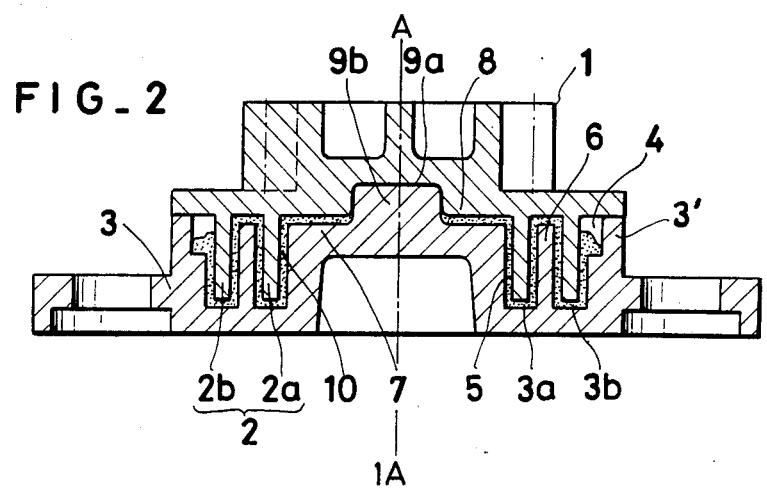
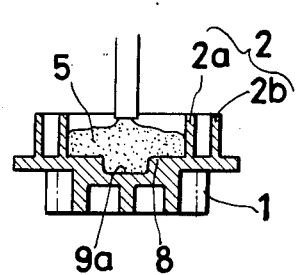
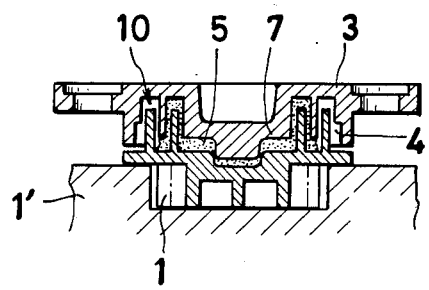
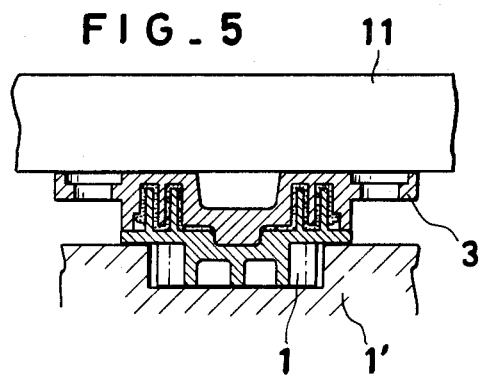
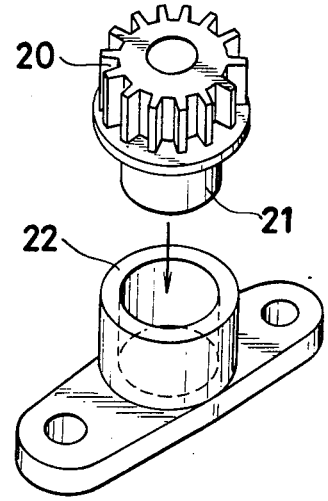

VISCOUS ROTARY DAMPER

FIELD OF THE INVENTION AND RELATED ART STATEMENT

This invention relates to a rotary damper and, more particularly, to a rotary damper having a driven gear in mesh with a rack or another gear and used for braking the movement of the rack or gear by the viscosity of a grease such as silicone oil.

There has been known a rotary damper consisting of a driven gear and a cylindcal case with a bottom, as disclosed in Japanese Utility Model Publication No. 59-25604. Although this rotary damper is inferior in such aspects as durability and temperature characteristics to higher precision rotary dampers having a greater number of components, it is useful in low-cost applications where the frequency of use is low or where the driven gear is rotated to a small extent or otherwise under conditions of use which are not so severe.

FIG. 1 shows this well-known rotary damper. The rotary damper comprises a driven gear 20 and a case with a bottom. Grease is applied to the outer periphery of a cylindrical projection 21 projecting from the rear surface of the driven gear 20, and the cylindrical projection 21 with grease thereon is fitted within a cylindrical wall 22 of the case. With this construction, air is liable to be trapped in a gap defined between the outer periphery of the cylindrical projection 21 and the inner periphery of the cylindrical wall 22. In this case, grease-free portions are formed irregularly, giving rise to fluctuations in the braking effect. In addition, the intruding air oxidizes and deteriorates the grease.

OBJECT AND SUMMARY OF THE INVENTION

An object of the invention is to provide a rotary damper which provides a uniform braking effect stably and continuously for a long period of time.

To attain the above object of the invention, there is provided a rotary damper which comprises a driven gear having a cylindrical projection projecting from its rear surface and a case with a bottom and having a cylindrical groove, the cylindrical projection being received in the cylindrical groove, grease filling a gap defined between the cylindrical projection and the cylindrical groove, an outer wall of the case defining the cylindrical groove being formed on its inner periphery and adjacent to its distal end with an annular depression having a greater outer diameter than the diameter of the inner periphery, and the grease being partly forced out into the annular depression.

With the above rotary damper according to the invention, the grease fills the gap between the cylindrical projection of the driven gear and the cylindrical groove of the case and is partly forced out from the gap into the annular depression formed in the inner periphery of the cylindrical outer wall of the case adjacent to the open end thereof. The grease forced out into the annular depression can prevent the trapping of air at the time of rotation of the driven gear. It is thus possible to reduce the deterioration of the grease, suppress reduction of the braking effect and maintain uniform braking effect.

The above and other objects and features of the invention will become more apparent from the following description with reference to the accompanying drawings.

BRIEF DESCRIPTION OF THE DRAWINGS

FIG. 1 is an exploded perspective view showing a well-known rotary damper;

FIG. 2 is a sectional view showing an embodiment of the rotary damper according to the invention;

FIG. 3 is a sectional view showing a driven gear of the rotary damper according to the invention being filled with grease;

FIG. 4 is a sectional view showing the driven gear and a case with a bottom assembled together; and FIG. 5 is a sectional view showing the assembly of the driven gear and the case being pressed to obtain a rotary damper.

DESCRIPTION OF THE PREFERRED EMBODIMENT

Referring to FIGS. 2 to 5, there is shown an embodiment of the invention. A driven gear 1 has a cylindrical projection 2 projecting from its rear surface and constituting coaxial inner and outer cylindrical walls 2a and 2b. A case 3 with a bottom, which has a shape complementary to the driven gear, has coaxial inner and outer grooves 3a and 3b defined by an intervening cylindrical partition wall 6. The inner and outer cylindrical walls 2a and 2b are adapted to be loosely received in the respective inner and outer grooves 3a and 3b. An outer cylindrical wall 3' of the case 3 has an annular depression 4 open at the open end of wall 3', which is slightly projected with respect to the cylindrical partition wall 6.

The central portion 7 of the case surrounded by the inner groove 3a is flush with the top of the cylindrical partition wall 6. The central portion 7 and a rear central portion 8 of the driven gear 1 are respectively provided with a cylindrical recess 9a and a cylindrical projection 9b having a height slightly greater than the depth of the cylindrical recess 9a, the projection being snugly received in the recess. In this embodiment, the cylindrical recess 9a is provided on the side of the rear central portion 8 of the driven gear while the cylindrical projection 9b is provided on the side of the central portion 7 of the case. However, they may be provided on the other sides, respectively.

When the driven gear 1 is received in the case 3, the cylindrical projection 9b is received in the cylindrical recess 9a so that the end of the former is in contact with the bottom of the latter while the inner and outer cylindrical walls 2a and 2b are received in the inner and outer grooves 3a and 3b. In this state, coaxial annular gaps are defined by the inner and outer peripheral surfaces of the inner and outer cylindrical walls 2a and 2b and the inner and outer grooves 3a and 3b. Also, gaps extending in the radial direction are defined between the rear surface of the driven gear 1 and the central portion 7 of the case, between the driven gear rear surface and the end of the partition wall 6, and between the end of the inner and outer cylindrical walls 2a and 2b and the bottom of the inner and outer grooves 3a and 3b. The end of the outer cylindrical wall 3' of the case is in contact with the rear surface of the driven gear 1. The annular gaps and the gaps extending in the radial direction form a continuous gap 10 having a meandering sectional profile between the driven gear 1 and the case 3 and communicating with the annular depression 4.

To assemble a rotary damper from the driven gear 1 and the case 3, the driven gear is placed with the inner and outer cylindrical walls 2a and 2b pointing upward, the space defined by these cylindrical walls is filled with grease 5 supplied from an injection tube. The grease 5 is supplied in the manner as shown in FIG. 3. The grease 5 fills the gap 10 and is slightly forced out into the annular depression 4. In this state, the case 3 is fitted on the driven gear 1 with the inner and outer cylindrical walls 2a and 2b of the former received in the inner and outer grooves 3a and 3b of the latter (FIG. 4). The assembled system is then held pressurized with a weight 11 placed on it, as shown in FIG. 5.

The grease 5 thus is forced out from between the central portion of the case and the cylindrical projection 9b into the gap 10. By the time the end of the cylindrical projection 9b comes into contact with the bottom of the cylindrical recess 9a, the annular depression 4 is filled with a certain amount of the grease 5 forced out from the gap 10.

If necessary, the rear surface of the driven gear 1 and the corresponding end of the outer cylindrical wall 3' may be welded or bonded together.

Any external force tending to rotate the driven gear 1 is resisted by the viscosity of the grease filling the gap 10. Since the annular depression 4 communicating with the outer end of the gap 10 is filled with grease 5 forced out of the gap 10, when the driven gear 1 is rotated, air will not be introduced into the gap 10. Thus, a uniform braking effect can be obtained. In addition, deterioration of the grease is less likely. Particularly, in this embodiment the annular depressions are filled with grease. The deterioration of the grease progresses from the portion filling the outermost annular gap toward the portion filling the innermost annular gap. Therefore, it takes a very long time before the grease is totally deteriorated and loses its function. That is, the rotary damper has a very long service life compared with one according to the prior art construction.

Further, with this embodiment the driven gear 1 and the case 3 are coaxially positioned in the assembled state by the cylindrical recess 9a and the cylindrical projection 9b received therein. Thus, they will not deviate from each other at the time of the rotation of the driven gear. Reference numeral 1' designates an arm having a depression for stationarily accommodating the rotary damper therein.

As has been described in the foregoing, according to the invention the grease that has been forced out into the annular depression formed in the inner periphery of the cylindrical outer wall of the case adjacent to the open end thereof serves to prevent the intrusion of air into the meandering gap portion at the time of the rotation of the driven gear. It is thus possible to provide a rotary damper which has a uniform braking effect and has an effect of preventing the deterioration of the grease.

Further, the annular depression receives grease that is forced out into it from the meandering gap 10 with temperature-induced expansion of the grease volume and prevents this grease from leaking to the outside. On the other hand, the annular depression supplies grease into the meandering gap when the grease in the meandering gap contracts in volume. Therefore, it prevents the formation of any grease-free portion in the meandering gap. Further, it is only necessary to supply grease to such an extent that a certain amount of grease is forced out into the annular depression. Thus, the amount of grease charged need only be comparatively roughly controlled. In addition, defective products can be reduced in the manufacturing operation. It is to be understood that the annular depression effectively serves the function of a cushioning tank for the grease filling the meandering gap defined by the cylindrical walls and the annular grooves of the case.

What is claimed is:

1. A rotary damper comprising a driven gear having a rear surface, an axis of rotation and a cylindrical annular projection projecting from said rear surface coaxially with said gear axis, a case with a transverse bottom and having an axially extending cylindrical annular groove coaxial with said gear axis, the cylindrical annular projection being received in the cylindrical annular groove, there being a gap defined between the cylindrical annular projection and the cylindrical annular groove, grease filling said groove, an outer wall of the case defining the cylindrical annular groove having an inner periphery and a distal end opposite said bottom and being formed on said inner periphery and adjacent to said distal end with an axially extending annular depression having a greater outer diameter than the diameter of said inner periphery, said gear including a portion substantially covering said annular depression and the grease being partly forced out into the annular depression.

2. A rotary damper as set forth in claim 1 wherein the gear projection comprises a pair of radially spaced coaxial annular cylinders with a cylindrical annular space therebetween, and wherein the case cylindrical annular groove has an axially extending cylindrical annular wall extending into said cylindrical space between said pair of annular cylinders and free of direct contact therewith.

3. A rotary damper as set forth in claim 1 and further including a cylindrical recess in the rear surface of said gear on said gear axis, and a cylindrical projection on said case received in said cylindrical recess and limiting axial approach of said gear and said case toward one another.

* * * * *